Sept. 14, 1954  J. J. J. STAUNTON  2,689,330
DIFFERENTIAL DROPPING MERCURY ELECTRODE
INSTRUMENT AND METHOD
Filed Nov. 27, 1950  3 Sheets-Sheet 1

Inventor
John J. J. Staunton
By McCanna and Morsbach
Attorneys

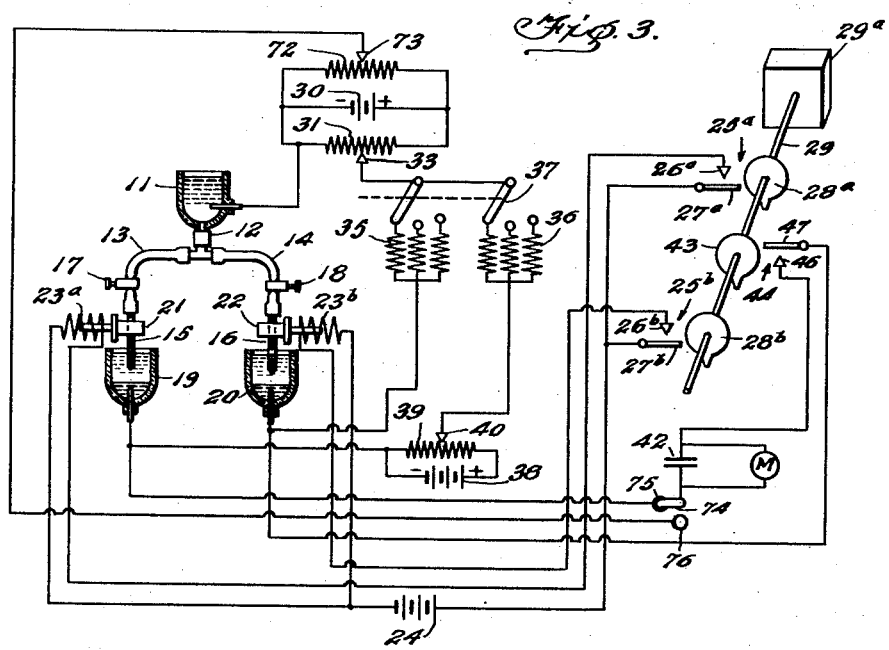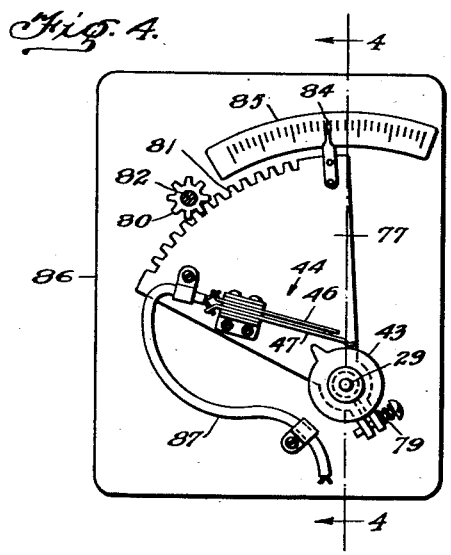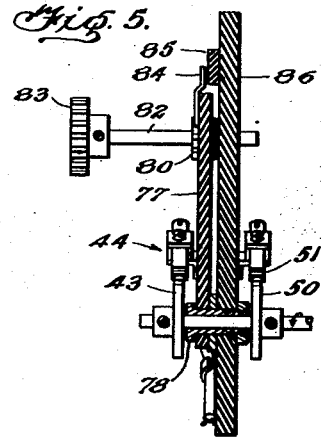

Sept. 14, 1954    J. J. J. STAUNTON    2,689,330
DIFFERENTIAL DROPPING MERCURY ELECTRODE
INSTRUMENT AND METHOD
Filed Nov. 27, 1950                    3 Sheets-Sheet 3
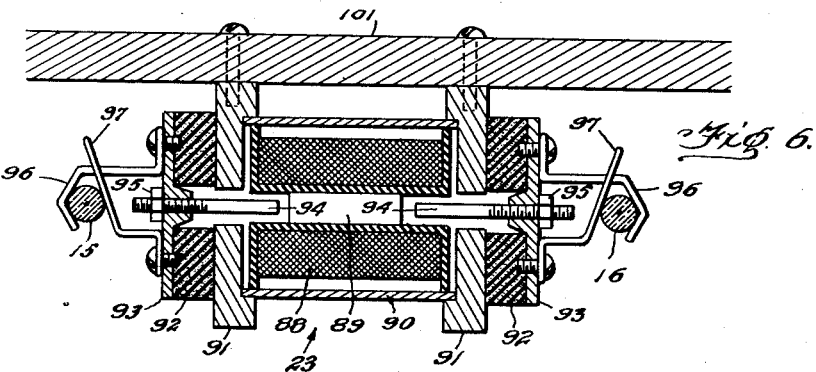
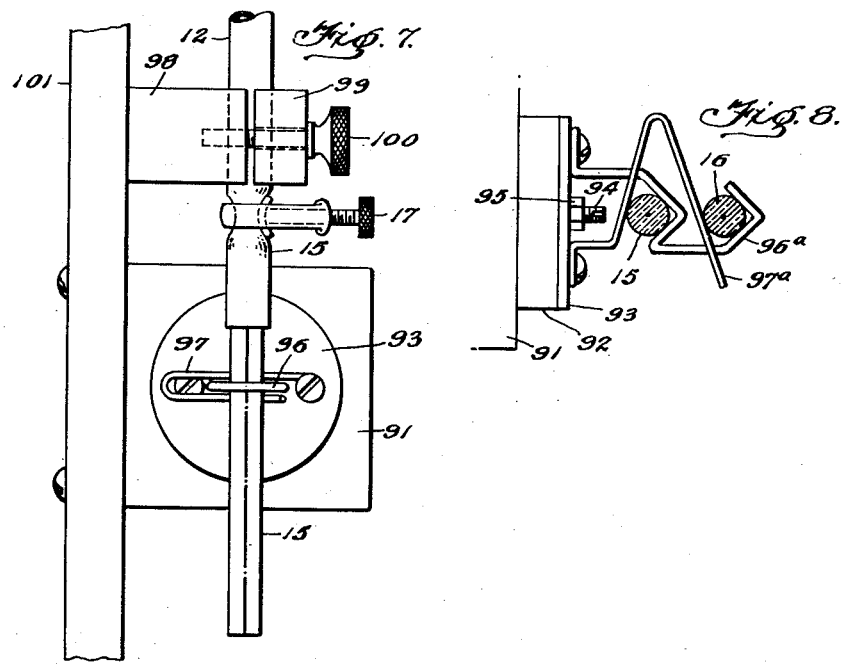
Inventor
John J. J. Staunton
By McCanna and Morsbach
Attorneys

Patented Sept. 14, 1954

2,689,330

UNITED STATES PATENT OFFICE 2,689,330

DIFFERENTIAL DROPPING MERCURY ELECTRODE INSTRUMENT AND METHOD

John J. J. Staunton, Oak Park, Ill., assignor to Coleman Instruments, Inc., Maywood, Ill., a corporation of Illinois Application November 27, 1950, Serial No. 197,750

26 Claims. (Cl. 324—31)

This invention relates to improvements in method and apparatus for making chemical analyses of the type known as "differential polarography," in which an electric current is passed between a dropping mercury test electrode and a reference electrode immersed in the liquid under test.

In the method of Semerano and Riccoboni ("Gaz. Chim. Ital.," 72, p. 297 (1942)), there are provided two solutions and two dropping mercury test electrodes. The first solution contains the constituents which it is desired to measure and certain interfering constituents whose presence in the test solution normally would obscure or render inaccurate the test results. The second solution is adjusted to contain only the interfering constituents present in the first solution, which interfering constituents affect the test results of the second solution to the same degree as the interfering constituents in the first solution affect its test results. The outputs of the first and second solutions are then combined to oppose each other so that the net output is due solely to the desired constituents which it is desired to measure in the first solution. Thus, by providing a second solution containing only the interfering constituents it is possible to cancel out the effects of the interfering constituents unavoidably present in the test solution.

In the method of Heyrovski ("Chem. Listy," 40, p. 222 (1946); "Analyst," 72, p. 229 (1947)), two dropping mercury electrodes are provided with the single solution under test. Different potentials are applied to the dropping mercury electrodes, and this results in different currents flowing in each. The difference in these currents is measured, and this is plotted against voltage applied to one of the electrodes. (A constant potential difference between the dropping mercury electrodes is maintained.) The resulting curve shows maxima, or peaks, where the slope of the current-voltage wave is maximum—that is, at the "half wave potentials" characteristic of the particular constituent present. The height of each peak is proportional to the concentration of that particular constituent in the solution.

In practicing these methods (both of which are briefly outlined in "Analytical Chemistry," January 1949, p. 57), considerable difficulty and inaccuracy is encountered when the dropping mercury electrodes are non-synchronized. These inaccuracies can be caused by differences in the capillaries feeding mercury to the test cells, or from electro-capillarity effects which alter the natural dropping rate of the test electrodes as the applied voltage is changed, so that the dropping of the two test electrodes cannot be maintained in a constant phase relationship.

An object of this invention is to provide improved apparatus for differential polarography which obviates the difficulties heretofore associated with periodic current fluctuations in the test cells.

Another object of this invention is to synchronize the dropping mercury apparatus and render the mercury drops electrically equal for purposes of measurement, so that a balanced electrical circuit can be used.

A further object of this invention is to compensate in the cell circuit for voltage drops in the measuring elements, to thereby cause the measuring instrument to read directly without the necessity for converting the results.

A still further object of this invention is to vary the sensitivity of the measuring apparatus in steps of known ratio without the necessity of rebalancing the measuring circuit.

A further object of this invention is to provide differential polarography equipment which is readily adapted for either of the broad methods of Heyrovski or Semerano and Riccoboni.

A specific object of this invention is to provide a differential polarography circuit employing a single synchronized dropping mercury electrode.

Further objects and advantages of the invention will become apparent from a consideration of the following description and the drawings, in which—

Figure 1 schematically shows an embodiment of the invention which is readily adapted for use with the two-solution method of Semerano and Riccoboni or the one-solution method of Heyrovski;

Fig. 3 illustrates a still further form of the invention which functions to perform the two-solution method of Semerano and Riccoboni.

Fig. 4 is a plan view showing one form of adjustable switch for use in my novel apparatus;

Fig. 5 is a sectional view taken along the line 4—4 of Fig. 4;

Fig. 6 is a top sectional view illustrating a mounting for the capillary tubes of my invention;

Fig. 7 is an end view showing the mounting of the capillary and the tube from the mercury reservoir, and Fig. 8 shows a double clamp mounting for two capillaries used in a single cell.

Figure 1:
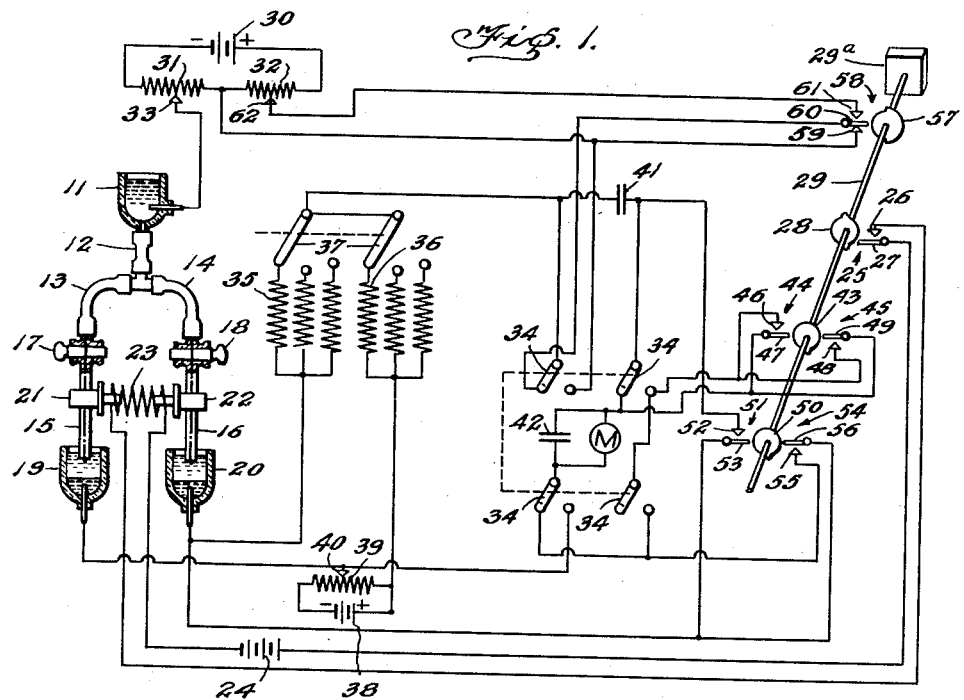

In Figure 1 the mercury dropping electrode system includes an elevated mercury reservoir 11 from which there is a depending tube 12 bifurcated at its lower end to form two separate tubes 13, 14. These tubes 12, 13 and 14 may be made of rubber if desired. At their lower ends tubes 13, 14 communicate with capillaries 15, 16, which may preferably be of the type known as Corning Marine Barometer Tubing, having a bore of about .003 inch and a length of about three (3) inches. Suitable shutoff means 17, 18 may be provided with each capillary to interrupt the flow of mercury to either or both capillaries. Test cells 19, 20 are provided with the capillaries, and may be of any of the several forms well known in the art. The capillaries 15, 16 are mounted in suitable clamps 21, 22 which are connected to the plunger core of an electromagnetic solenoid 23, in a manner more fully discussed below in connection with Fig. 6. A source of power for the solenoid, here shown as battery 24, is periodically connected therewith by normally open switch 25, which comprises a fixed contact 26 and a movable contact 27 positioned to be actuated by a cam 28 mounted on shaft 29 and driven at a uniform speed by synchronous motor 29a. The circuit is closed at successive intervals of time, on the order of once every halfsecond, by the engagement of cam 28 with switch 25, to energize solenoid 23 to cause release of a mercury drop from each capillary. Reference may be had to Kanner et al. Patent 2,361,295 for a discussion of the action of the solenoid in causing release of a mercury drop.

For applying voltages across the test cell, there is provided a battery 30, or other suitable source of E. M. F., whose voltage is accurately known. In series with this power source are potentiometers 31 and 32 of resistance values such that the voltage drop across 31 is about three volts and the voltage drop across 32 is approximately 200 millivolts, although it is to be understood that these resistance values can be varied depending upon the design of the overall circuit. It will be seen that the adjustable tap 33 on potentiometer 31 normally determines the voltage applied to the dropping mercury electrodes.

A four-pole, double-throw switch 34 is provided in the circuit for controlling the operation of the system to function in either of two ways, to be described in detail. 35 and 36 represent a plurality of pairs of identical resistors, the resistors in each pair being adapted to be connected in the output circuits of the respective cells 19 and 20. The current flowing through cell 19 causes a voltage drop across the resistor 36 in circuit, so that the magnitude of this voltage drop represents the current in cell 19. Similarly the potential difference across the resistor 35 in circuit is proportional to the current in cell 20. For a desired sensitivity range switch 37 selectively connects a particular pair of resistors 35, 36 in circuit with the cells. Battery 38 provides a voltage drop across potentiometer 39, whose portion to the right of adjustable tap 40 is adapted to be connected in series between cell 19 and resistor 36.

41 is a condenser connected in series with resistors 35 and 36 and adapted to store the voltage drop across one of those resistors.

The net output voltage of the cells appears across condenser 42 to control the reading of meter M in parallel therewith. M may be any suitable indicating instrument of requisite sensitivity and electrical characteristics, such as a vacuum tube voltmeter or electrometer. In practice, an instrument having a full scale deflection of two millivolts and an impedance of the order of $10^9$ ohms has been found satisfactory. In place of meter M a recording instrument of suitable electrical characteristics may be inserted across condenser 42, or a record controller may be substituted there, since it is obvious to one skilled in the art that a further circuit may be made to be controlled by such instrument in parallel with condenser 42.

A cam 43 mounted on shaft 29 controls the actuation of switches 44 and 45 to determine the time at which the voltage drop across resistor 36, due to the current in test cell 19, may be applied to condenser 41. Switch 44 is normally open and includes a fixed contact 46 and an adjustable movable member 47 adapted to be moved into engagement with fixed contact 46 under the urging of cam 43. Switch 45 similarly includes a fixed contact 48 and an adjustable movable contact 49 adapted to be moved by cam 43 to close the electrical circuit.

Cam 50, also mounted on shaft 29 driven by motor 29a, controls the actuation of switches 51 and 54 to determine the time at which the voltage drop across resistor 35, due to the current in cell 19, is applied to condenser 41. Switch 51 includes a fixed contact 52 and a movable contact 53 positioned to be engaged by cam 50 to move into engagement with the fixed contact. Likewise, switch 54 includes a fixed contact 55 and a movable contact 56 adapted to be moved by cam 50 into engagement with the fixed contact.

Shaft 29 also drives a cam 57 for controlling switch 58, which in one method of using this system is adapted to vary the potential drop impressed across one of the test cells. The movable contact 60 of this switch normally engages fixed contact 59 so that the switch produces no electrical effect in the circuit. However, upon actuation by the projecting portion of cam 57, the movable switch arm 60 is moved into engagement with fixed contact 61 to add to the voltage impressed across the test cell an incremental voltage drop across that portion of resistor 32 to the left of tap 62.

Having outlined the apparatus of Figure 1, operation of this apparatus will first be discussed with reference to the broad method of Heyrovski, wherein only a single solution is employed. By the novel apparatus herein disclosed it is possible to follow the Heyrovski teaching in a novel manner using only a single synchronized mercury dropping electrode.

Accordingly, the flow of mercury to capillary 15 is shut off by member 17, so that mercury drops are formed only at capillary 16 for deposit into test cell 20. Switch 34 is connected to the left, as shown in Figure 1, so that switch 58 is in circuit with the system. It is evident that this positioning of switch 34 to the left renders switches 44 and 45 inoperative to affect the circuit in any way. Therefore the operation of those switches can be ignored with this set-up.

Rotation of shaft 29 causes cam 28 to close switch 25 twice per revolution to energize solenoid 23 to release a mercury drop from capillary 16 into the test solution in cell 20. In timed relation therewith, cam 57 by its alternate engagement with and disengagement from switch 58 periodically switches the voltage applied across the test cell. Thus, for one mercury drop the voltage across cell 20 is determined solely by the voltage drop across 31 to the right of tap 33. For the next mercury drop, an incremental increase in the applied voltage is furnished by the drop across resistor 32 to the left of tap 62. It is seen that there is a fixed difference between the voltages applied alternately to cell 20. Preferably, tap 62 may be adjusted so that this voltage difference is about 50 millivolts.

Since cam 50 is driven in timed relation with cam 28, the time at which the voltage drop across resistor 35, due to the current in cell 20, is applied to condenser 41 to be stored therein aways occurs at the same interval after the drop is released from capillary 16. This is because the closing of switch 51 or switch 54 for connecting condenser 41 in the circuit is coordinated with the closing of switch 25 which actuates solenoid 23 to release a drop from capillary 16.

In the first half revolution of shaft 29, with cam 57 not engaging switch 58, a voltage drop occurs across resistor 35 due to the current in cell 20 in response to the voltage applied from potentiometer 31 only. When cam 50 actuates switch 51 during this half revolution, the voltage across resistor 35 is "sampled," i. e., applied across condenser 41 to be stored therein.

During the next half revolution of shaft 29, switch 58 is engaged by cam 57 to apply an increased voltage, from tap 62, across the cell 20 to produce a current which is reflected as a voltage drop across 35 opposed to the voltage already stored in condenser 41. At the instant of sampling, i. e., when switch 54 is closed during this half revolution, the difference between these voltages will be applied across condenser 42 to actuate the meter.

As tap 33 is moved to the left, successively higher voltages will be applied to cell 20 to give the differential curve of Heyrovski. The voltage difference between alternate drops will, of course, remain constant since determined solely by the setting of tap 62.

Due to the synchronization present in my apparatus, whereby sampling occurs at a definite interval with respect to the formation of each mercury drop, it is possible to use a single dropping electrode in the novel manner described above. The adjustability of switches 51 and 54 facilitates the initial coordination of these switches with switch 25.

It is obvious that for purposes of obtaining the Heyrovski type of curve certain simplifications may be made in the apparatus shown in Figure 1. Thus, tube 13, capillary 15, test cell 19, potentiometer 38—40, switches 44 and 45, cam 43, resistors 36, and the right hand contacts of switch 34 can be eliminated, if desired.

The apparatus of Figure 1 is also adapted to perform the testing method according to the teaching of Semerano and Riccoboni. In this method, both capillaries 15 and 16 deliver mercury drops to the respective cells 19 and 20.

Switch 34 is thrown to the right hand position, opposite that shown in Figure 1. This serves to disconnect switch 58 from the circuit, so that the voltage applied to cells 19 and 20 is determined at all times solely by the setting of tap 33 on potentiometer 31.

This position of switch 34 to the right also connects switches 44 and 45 in circuit with the system.

The two liquid samples in cells 19 and 20, respectively, are analyzed concurrently. In accordance with the teaching of Semerano and Riccoboni, the solution in cell 20 contains the constituents which it is desired to measure, thus interfering constituents. The solution in cell 19 contains only interfering constituents, adjusted to affect the output indicator to the same extent as the interfering constituents in the first solution.

In operation, at a given instant after the mercury drop has been released from capillary 16 by the action of solenoid 23, under control of switch 25, the voltage drop across resistor 35 is sampled by the closing of either switch 51 or 54. This voltage drop, which represents the current in cell 20, is applied to condenser 41, which builds up and stores this voltage after a few cycles. Preferably both switches 51 and 54 are adjustable to regulate the sampling of cell 20 in timed relation with release of a drop from capillary 16.

Likewise, at a definite time interval after release of a mercury drop from capillary 15 the voltage drop across resistor 36 is sampled, by closing either switch 44 or 45. The voltage drop represents the current in cell 19. With the circuit connected as described above, the voltage drop across resistor 36, at the time of sampling by switch 44 or 45, opposes the voltage stored in condenser 41. The difference betwen these voltages charges condenser 42 to actuate indicating meter M.

If the slider 40 of potentiometer 39 is at the right end, then the meter indicates the difference between the voltage drops across resistors 35 and 36. The meter will then be a direct reading instrument, its reading being substantially proportional to the concentration of the constituent being analyzed. All other increments of current due to such factors as interfering constituents, charging currents, dissolved oxygen, or other impurities present to an equal degree in both solutions will be cancelled out.

Meter M can be operated as a null indicator by moving slider 40 to the left on potentiometer 39 until the voltage drop along the potentiometer to the right of this slider equals the difference between the voltage drops across resistors 35 and 36. The meter will thus read zero since the voltage drop from slider 40 to the remote end of resistor 36 then equals the voltage drop across resistor 35. The setting of the slider on potentiometer 39, which may be calibrated, indicates the difference in voltage drops across resistors 35 and 36, and thus the current due to the desired constituent being measured in cell 20. Greater precision may be obtained from this method of operation. Also, by this voltage compensation the potential drop across each cell is identical, thereby eliminating a small residual error which would be present if the voltages applied across the cells differed by the amount appearing across capacitor 42.

Both switches 44 and 45 are preferably adjustable so that the voltage drop across resistor 36 is sampled at such a time that it would exactly equal the voltage drop across resistor 35 at the time of its sampling if the cells 19 and 20 had identical solutions. By this adjustment, hereinafter referred to as equalization, differences between the rates of flow of capillaries 15 and 16 or in the electrical constants of the solutions and cells may be compensated for. Contacts 44 and 45 may be adjusted prior to analyzing unknown solutions by placing identical solutions in cells 19 and 20, and positioning switch contacts 47 and 48 so that equal voltage drops across resistors 36 and 35 are indicated on meter M.

Figure 2:
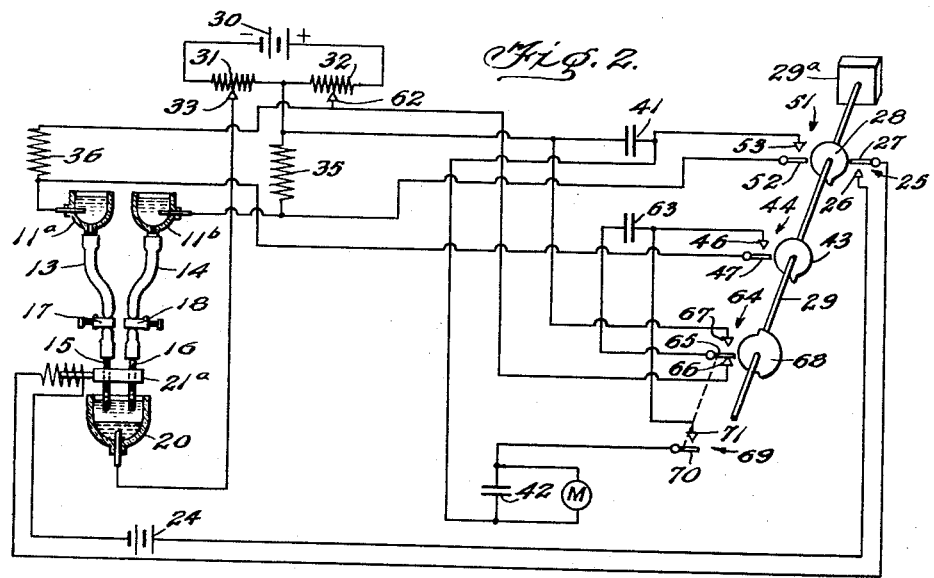
Fig. 2 is a schematic view showing another form of the invention which is designed to operate with the one-solution method of Heyrovski.

In Fig. 2 is shown another form of my invention adapted to carry out the testing according to the Heyrovski teaching. In this arrangement equalization of the drops from the different capillaries may be accomplished by releasing the mercury drops from the respective capillaries simultaneously and sampling the current in the respective cells at slightly different times.

In this figure, 11a and 11b represent separate mercury reservoirs supplying mercury through tubes 13 and 14 to capillaries 15 and 16, respectively, which are immersed in a common solution in cell 20. The voltage applied to the electrode at capillary 15 is determined by the voltage between tap 62 on resistor 32 and slider 33 on potentiometer 31 minus the drop across resistor 36. The voltage applied to the electrode at capillary 16 is determined by the voltage between the right end of potentiometer 31 and slider 33 minus the drop across resistor 35. A constant difference in these applied voltages is determined by the setting of tap 62. Movement of slider 33 to the left increases the applied voltages.

Cam 28 is arranged to close switch 25 once each revolution of shaft 29. This energizes solenoid 15 to actuate double clamp 21a so as to release mercury drops simultaneously from capillaries 15 and 16.

At a definite time interval thereafter, switch 51 is closed to apply the voltage drop across resistor 35 to condenser 41 to be stored therein. This voltage drop is proportional to the current flowing in the electrode at capillary 16. While for simplicity switch 51 is shown in Fig. 2 as being actuated by the same cam 28 which actuates switch 25, it is to be understood that any suitable arrangement may be provided for closing switch 51 at a certain time after closing switch 25. To this end, switch 51 is preferably adjustable so as to adjust its phase relation with switch 25.

In the same half-revolution of shaft 29, cam 43 closes switch 44 to apply the voltage across resistor 36 to condenser 63. At this time movable contact 65 of switch 64 bears against fixed contact 66 to close the circuit between resistor 36 and condenser 63. During this half-revolution of shaft 29, cam 68 does not engage movable switch arm 65.

The closing of switches 51 and 44 to sample the voltages across resistors 35 and 36, respectively, occurs at about the same time—any time displacement being for the purposes of equalizing the drops from capillaries 15 and 16. The initial adjustment for this purpose could be accomplished by setting tap 62 at the left end of potentiometer 32, so that, with resistances 35 and 36 being equal, the voltages applied to each electrode at capillaries 15 and 16 are equal. Then the timing of switches 51 and 44 is adjusted until the sampling voltages across resistors 35 and 36 are equal. It is to be understood that equalization might be effected by adjusting the heights of the mercury reservoirs 11a and 11b to equalize the rates of mercury flow through the respective capillaries.

After the sampling of both voltages has taken place, the next half-revolution of shaft 29 causes cam 68 to move switch arm 65 away from fixed contact 66 and into engagement with the other switch contact 67. At the same time, movable contact 70 of normally open switch 69 is caused to move into engagement with fixed contact 71 to close this switch. Contact 70 of switch 69 may be movable in unison with switch arm 65 of switch 64, or any other suitable means may be provided for closing switch 69 simultaneously with the movement of switch arm 65 into engagement with fixed contact 67. By this arrangement the respective voltages stored in condensers 41 and 63 are caused to oppose each other, the difference between these voltages being applied to condenser 42 to actuate meter M.

Figure 3 illustrates a further form of my invention for testing a solution according to the general principles of Semerano and Riccoboni. In this species of the invention, equalization of the drops from the respective capillaries may be effected by releasing the drops at slightly different times and sampling them simultaneously. Also provision is made for accurately determining the voltage applied to the dropping mercury electrodes.

Mercury from reservoir 11 is fed to capillaries 15 and 16 which are immersed in separate cells 19 and 20, respectively. Solenoid 23a, which is energized in response to the closing of switch 25a under actuation of cam 28a, is adapted to actuate clamp 21 to cause release of a mercury drop from capillary 15. Solenoid 23b actuates clamp 22 to effect release of a mercury drop from capillary 16 in response to the closing of switch 25b under the control of cam 28b. Either or both of these switches may be adjustable so as to control the time of releasing the mercury drops from the respective capillaries to equalize the drops, as previously explained.

The current through cell 19 causes a proportionate voltage drop across resistor 36, while the voltage drop across resistor 35 represents the current in cell 20. At the instant of closing switch 44, under the control of cam 43, these voltage drops in resistors 35 and 36 are connected in series opposition, so that the difference between these voltages is applied to condenser 42 to actuate meter M. At this time switch arm 74 engages contact 75.

To operate meter M as a direct reading instrument, tap 40 on potentiometer 39 is set at the left end, as shown in Fig. 3, so that this potentiometer does not add any voltage to resistor 36.

However, meter M may be operated as a null indicator with improved precision, as outlined in connection with Figure 1, by adjusting tap 40 to compensate for the difference in the voltage drops across resistors 35 and 36, respectively. As previously pointed out, this renders the voltages impressed at the dropping mercury electrodes equal.

This impressed voltage may be accurately determined by providing a calibrated potentiometer 72 connected across battery 30, which also supplies voltage for potentiometer 31. Switch 74 is then moved into engagement with contact 76. At this instant the voltage across condenser 42 equals the difference between the voltage at slider 73 and the voltage at slider 33 minus the drop across resistor 35. The voltage at the dropping mercury electrode of capillary 16 is obviously equal to the voltage at slider 33 minus the drop across resistor 35. By adjusting potentiometer 73 until there is a zero reading of meter M, indicating zero net voltage across condenser 42, it is seen that the voltage at slider 73 exactly equals the voltage impressed at the dropping mercury electrode.

It will be obvious to those skilled in the art that various combinations and modifications of the different features present in the several embodiments illustrated herein may be made, without departing from the spirit and scope of my invention. Therefore, the specific embodiments heretofore described are to be taken primarily as illustrative of my invention and not in a limiting sense.

Figs. 4 and 5 represent an embodiment of one of the adjustable switches referred to previously in the description. As is evident to one versed in the art, there are many possible ways of making one set of contacts adjustable in phase with respect to others, and accordingly, it is to be understood that the embodiment shown in Figs. 4 and 5 is not restrictive on the disclosures herein contained, but merely illustrative. Referring to Fig. 4, the adjustable switch 44, having a fixed contact 46 and movable contact 47, is mounted on a movable member 77 which may be rotated about a fixed bearing 78 coaxial with the cam shaft 29. This member 77 has imposed on it a sufficient restraint by means of an adjustable clamp 79 to prevent other than intentional displacement. Such displacement is effected by means of a pinion 80 meshing with gear teeth 81 cut into the edge of member 77. This pinion is rotated by a shaft 82 which is operable by a knob 83. It is to be understood that there are many other ways for effecting the desired displacement. The position of member 77 and the switch 44 affixed thereto is indicated by index 84 which moves in close juxtaposition to a scale 85. The bearing support member 77, which may also, as shown, be used as a bearing for the cam shaft 29, on which is mounted cam 43, is fixed rigidly in a stationary supporting member 86 which is generally secured to the frame carrying the synchronous motor which drives cam shaft 29 and also carrying any other members similar to 86 on which are mounted other switches. Since such construction is obvious to one versed in the art it has not been indicated in Fig. 4. Connection is made to switch 44 by means of a suitable flexible cable 87.

On the obverse side, or elsewhere on member 86, may be mounted other switches such as switch 51, shown in Fig. 5, which is operated by cam 50. It will be apparent that as member 77 is rotated about its bearing 78 the relative position of contact closure of switch 44, as referred to that of switch 51, will be changed so that the phase of these contacts may be adjusted with respect to each other.

Although the apparatus herein disclosed is adapted for use with any of the several types of synchronous dropping mercury electrodes previously disclosed in Kanner et al., 2,361,295 and Coleman 2,343,885, a preferred method for mounting the capillaries and for effecting release of the mercury drops therefrom is shown in Figs. 6, 7 and 8. In these figures, Fig. 6 shows a top sectional view of solenoid 23 with provision for holding two capillaries, each in its corresponding test cell. Fig. 7 shows an end view of solenoid 23 showing details of the capillary mounting and a method of supporting the mercury tube 12. Fig. 8 shows a clamp for holding two capillaries in the same sample cell.

Referring to Fig. 6, an electromagnetic coil 88 surrounds a fixed soft iron core 89 and is itself surrounded by a protective cell 90 which may be of soft iron, providing a shield for the magnetic flux of the coil. At either end of the coil, soft iron supports 91 are mounted and these serve the purpose of holding the whole assembly to a suitable mounting plate 101. Metal plates 93 are held at a suitable distance from members 91 by soft rubber or other compliant spacers 92 cemented or otherwise affixed to plates 93 and 91. This mounting is such that it permits plates 93 to be drawn toward the solenoid core a short distance by means of soft iron plungers 94 threaded into the plate 93 and constituting the movable elements of the electromagnetic solenoid. The position of these plungers 94 may be adjusted with respect to fixed core 89 by screwing them inward or outward in plate 93, and the position thus obtained may then be fixed by jam nuts 95.

Capillaries 15 and 16 are held in spatial relation to the plates 93 by a clamp consisting of two members, one a locating member 96, in this embodiment being a member of stiff wire formed substantially as shown, and a spring retaining member 97, in this embodiment being a member formed of lighter, more resilient wire than 96 and capable of being bent by pressing the free end so as to release the capillary from locating member 96, if desired. The clamp, composed of members 96 and 97, represents a practical and useful form of capillary clamp; however, it is recognized that many other ways of securing the capillary to plate 93 could be employed without affecting seriously the proper function of the solenoid. The action of this solenoid is such that when a pulse of electric current is passed through the winding 88 the magnetic field set up in core 89, plungers 94, and members 91, and cell 90 is such as to cause both plungers to be drawn inward toward core 89. This sudden movement of the plungers 94 is transferred through plates 93 and the capillary clamps to the capillaries 15 and 16 which are thereby displaced laterally at the point of clamping.

Referring now to Fig. 7 it will be seen that capillary 15 is introduced at its upper end into the flexible mercury tube 12. Mercury tube 12 is held closely by a fixed clamp comprising members 98 and 99 and encircling the mercury tube which confine it to any desired degree when thumb screw 100 is tightened. This stationary mounting provided by the clamp 98, 99 and the inertia of the mercury in the tube 12, and to some extent, the inertia of pinch cock 17, which is suitably introduced at the point shown in Fig. 7, all tend to constrain the upper end of the capillary 15 against lateral motion, but due to the flexibility of tube 12 no bar is placed to its rotation about an axis substantially at the top end of the capillary tube. Accordingly the impulse transmitted to the capillary tube through its clamp rotates its tubing substantially at its upper end, thereby causing an amplified displacement of the lower end of the capillary. The shape of the capillary clamp offers no substantial restraint to this rotation, and the effect of the amplification of the lateral motion of the capillary is to produce an effective separation between the mercury drop at the end of said capillary and the mercury column contained within said capillary, said separation being at an instant precisely determined by the instant of the current pulse through solenoid winding 88, and being identical in time for both capillaries 15 and 16.

In other embodiments of this invention where two capillaries enter the same solution it has been found preferable to mount these two capillaries side by side, utilizing for their displacement and constraint a clamp of the nature shown in Fig. 8. The principle of operation of this clamp on the capillary and the general details of its mounting are evident from Fig. 8. When such a double clamp is used, if so desired, the core 89 of solenoid 23 may be extended into the member 91 at the opposite end of the solenoid from the capillary clamp, the capillary clamp and actuating members being only at the one end of the solenoid 23.

The preceding description is believed to impart to those skilled in the art a complete and adequate disclosure of the invention sufficient to permit practice of the same, and is given by way of illustration and not limitation.

I claim:

1. In a device of the character described, in combination, means for forming discrete drops of mercury for passage into liquid under test, means for applying a potential difference across each of said discrete mercury drops and the liquid under test, means operative in timed relation with the formation of mercury drops for producing in response to the respective currents to the discrete mercury drops potential differences proportionate respectively to the current to each discrete mercury drop, and means operable in timed relation with said last-mentioned means for combining in subtractive relation the potential differences so produced to indicate the difference between the respective currents to the discrete mercury drops.

2. In a method of differential polarography, the steps of initiating the formation of discrete drops of mercury for passage into liquid under test, applying a voltage across each of said discrete mercury drops and the liquid under test, effecting a measurable response proportional to the current to each drop in timed relation with respect to said drop formation, and combining in subtractive relation the responses so produced to indicate the difference between them.

3. In combination, a first dropping mercury electrode positioned in solution, a second dropping mercury electrode positioned in solution, means for initiating the formation of mercury droplets at said dropping electrodes, means for applying a potential difference across the solution and each of said mercury droplets, means operative in timed relation with respect to said initiating means for effecting momentary measurable responses to the currents to the respective dropping electrodes and for comparing these responses, and means for adjusting the relative timing between said initiating means and said measuring means to compensate for differences between the dropping electrodes.

4. Apparatus in claim 3, further characterized in that said adjusting means comprises means for initiating droplets at the first dropping electrode at different times from the initiation of droplets at the second dropping electrode.

5. The apparatus of claim 3, further characterized in that said adjusting means comprises means for varying the time at which the current to the first electrode is measured relative to the time at which the current to the second electrode is measured.

6. In combination, dropping mercury electrode means for producing discrete drops in a test solution, means for applying a potential difference across each of said discrete drops and the test solution, means operative in timed relation with the formation of mercury drops for producing voltages proportional to the currents to the respective discrete mercury drops, and means operative in timed relation with said last-mentioned means for subtractively combining the voltages so produced.

7. In combination, dropping mercury electrode means for forming discrete drops of mercury in a test solution, a reference electrode disposed in the test solution, means for initiating the formation of discrete mercury droplets at said dropping electrode means, means operative in timed relation with respect to said droplet initiating means for applying at the respective discrete droplets voltages differing by a predetermined amount, means operative at a predetermined time after said droplet initiating means for storing a voltage proportional to the current to one droplet, and means operative at a predetermined time after said droplet initiating means for producing a voltage proportional to the current to another discrete droplet in opposition to said stored voltage.

8. In a method of making tests upon a liquid in which electric current is passed through the liquid using a dropping mercury electrode as one electrode, the steps of applying voltages differing by a predetermined amount to alternate mercury drops, starting the formation of a mercury droplet at a predetermined time during the application of each particular voltage, effecting a momentary measurable response to the electric current to each said droplet at a predetermined time after its formation, and comparing the responses due to currents to alternate droplets.

9. In combination, a reference electrode and a dropping mercury electrode disposed in a test sample, a circuit for impressing voltages across said electrodes, means for initiating the formation of successive mercury droplets at said dropping electrode, means acting in timed relation with said droplet initiating means for applying across the electrodes alternately at successive droplets voltages differing by a fixed amount, means for effecting a measurable response to the current flowing to each droplet at a predetermined time after initiation thereof, and means for combining the responses for successive droplets to indicate the difference between them.

10. In combination, a reference electrode and a dropping mercury electrode submerged in a test solution, a circuit for impressing voltages across said electrodes, means for initiating the formation of successive mercury droplets at said dropping electrode, means for alternating the voltage applied across the electrodes at successive droplets, said alternate applied voltages differing by a fixed amount, means acting in timed relation with the formation of mercury droplets for producing potential differences proportional to the current to each droplet, and means for combining the potential differences due to the currents to successive droplets.

11. In combination, a reference electrode and a dropping mercury electrode immersed in a test solution, an adjustable first voltage source for impressing voltages across said electrodes, a second voltage source for impressing voltages across said electrodes, circuit connections from said electrodes to said first and second voltage sources for maintaining a fixed difference between the respective voltages applied across said electrodes from the first and second voltage sources, means for initiating the formation of successive mercury droplets at said dropping electrode, switch means acting at a predetermined time with respect to the formation of each droplet for alternately connecting the first or second voltage source across said electrodes, resistance means connected in circuit with said electrodes for producing voltage drops proportional to the current to each mercury droplet, energy storage means for storing the voltage across said resistance means due to the current to one mercury droplet, and means acting in timed relation with the formation of the next mercury droplet for subtractively combining said stored voltage with another voltage across said resistance means due to the current to the last-mentioned mercury droplet.

12. In combination, a first dropping mercury electrode positioned in a test solution, a second dropping mercury electrode positioned in the same test solution, a reference electrode positioned in the test solution in spaced relation from said first and second dropping mercury electrodes, a first voltage source for applying a voltage to said first dropping electrode, a second voltage source differing by a predetermined amount from said first voltage source for applying a voltage to said second dropping electrode, means for initiating the formation of mercury droplets at the respective dropping electrodes, means operative in timed relation with respect to said droplet initiating means for effecting measurable responses to the currents to the respective dropping electrodes, and means for comparing the responses for the respective electrodes.

13. Apparatus as in claim 12, further characterized by means for adjusting the time relationship between the formation of a mercury droplet and the respective measurable response to compensate for differences between the dropping electrodes.

14. In combination, a first dropping mercury electrode positioned in a test solution, a second dropping mercury electrode positioned in the same test solution, a reference electrode positioned in the test solution in spaced relation from said first and second dropping mercury electrodes, a first voltage source for applying a voltage to said first dropping electrode, a second voltage source differing by a predetermined amount from said first voltage source for applying a voltage to said second dropping electrode, means for initiating the formation of mercury droplets simultaneously at both dropping electrodes, first means operative at a predetermined time after initiation of the mercury droplets for storing a voltage proportional to the instantaneous current to the first dropping electrode, second means operative in timed relation with respect to the initiation of the mercury droplets for causing a voltage drop proportional to the instantaneous current to the second dropping electrode to oppose said stored voltage, means for adjusting the relative timing of said first and second operative means to equalize the effects of the dropping electrodes, and indicating means responsive to the difference between said opposed voltages to indicate the difference between the currents to the dropping electrodes.

15. In combination, a first dropping mercury electrode positioned in a test solution, a second dropping mercury electrode positioned in the same test solution, a reference electrode positioned in the test solution in spaced relation from said first and second dropping mercury electrodes, a first voltage source for applying a voltage to said first dropping electrode, a second voltage source differing by a predetermined amount from said first voltage source for applying a voltage to said second dropping electrode, equal resistances connected respectively between the voltage sources and the dropping electrodes for producing voltage drops representative of the respective currents to the dropping electrodes, means for initiating the formation of mercury droplets simultaneously at both dropping electrodes, first means operative in timed relation with respect to the initiation of mercury droplets for storing the instantaneous voltage across the resistance connected to the first dropping electrode, second means operative in timed relation with respect to the initiation of mercury droplets for storing the instantaneous voltage across the resistance connected to the second dropping electrode, means for adjusting the relative timing of said first and second operative means to equalize the effects of the dropping electrode, and means operative a predetermined time after the initiation of mercury droplets for connecting a meter in circuit with said stored voltages to measure the difference between them.

16. In combination, a first test cell comprising a reference electrode and a dropping mercury electrode positioned in a first test solution, a second test cell comprising a reference electrode and a dropping mercury electrode positioned in a second test solution, means for applying voltages across said test cells, means for initiating the formation of mercury droplets at said dropping electrodes, means acting in timed relation with said droplet initiating means for effecting measurable responses to the currents in said test cells, and means for comparing said responses.

17. In combination, a first test cell comprising a reference electrode and a dropping mercury electrode positioned in a first test solution, a second test cell comprising a reference electrode and a dropping mercury electrode positioned in a second test solution, means for applying equal potentials at the dropping electrodes of both cells, means for initiating the formation of mercury droplets at said dropping electrodes, means operative in timed relation with respect to said droplet initiating means for measuring voltages proportionate respectively to the currents in said test cells, and adjustable voltage supply means connected in circuit with the reference electrode of one of said test cells for supplying a voltage equal to the difference between said measured voltages and for equalizing the potentials at the reference electrodes of the cells.

18. In combination, a first test cell comprising a reference electrode and a dropping mercury electrode positioned in a first test solution, a second test cell comprising a reference electrode and a dropping mercury electrode positioned in a second test solution, means for applying equal voltages at the dropping electrodes of both cells, equal resistances respectively connected in series with the reference electrode of each cell, means for initiating the formation of mercury droplets at the dropping electrodes of the respective cells, and means operative in timed relation with the mercury droplet initiating means for indicating the potential difference between the reference electrodes of the cells as a measure of the difference between the currents in the cells.

19. In combination, a first test cell comprising a reference electrode and a dropping mercury electrode positioned in a first test solution, a second test cell comprising a reference electrode and a dropping mercury electrode positioned in a second test solution, means for applying equal potentials at the dropping electrode of each cell, paired equal resistances adapted to be connected in circuit respectively with the first and second test cells for producing voltage drops proportional to the respective currents therein, first switch means acting in timed relation with the formation of a mercury droplet at the dropping electrode of the first cell for connecting the respective resistance in circuit with the first cell, second switch means acting in timed relation with the formation of a mercury droplet at the dropping electrode of the second cell for connecting the other resistance of the pair in circuit with the second cell, means for adjusting the relative timing of the first and second switch means to equalize the effects of the dropping electrodes, and means for combining the voltage drops across the respective resistances to indicate the difference between the currents in the respective cells.

20. In combination, a first test cell comprising a reference electrode and a dropping mercury electrode positioned in a first test solution, a second test cell comprising a reference electrode and a dropping mercury electrode positioned in a second test solution, means for applying equal potentials at the dropping electrode of each cell, a plurality of paired equal resistances adapted to be selectively connected respectively in circuit with the first and second cells so as to produce across the resistances of the pair connected in circuit voltage drops proportional to the currents in the respective cells, means for initiating the formation of mercury droplets at said dropping electrodes, means acting in timed relation with said droplet forming means for connecting the resistances in circuit with the respective cells, and means for combining said voltages to indicate the difference between them.

21. In combination, a first test cell comprising a reference electrode and a dropping mercury electrode positioned in a first test solution, a second test cell comprising a reference electrode and a dropping mercury electrode positioned in a second test solution, means for applying equal voltages at the dropping electrode of each cell, equal resistances adapted to be connected in circuit with the respective test cells so that the voltage drops across said resistances are proportionate to the currents in the respective cells, means for initiating the formation of mercury droplets at said dropping electrodes, means acting in timed relation with said droplet forming means for connecting the respective resistances in circuit with the cells, and an adjustable voltage source connected in circuit between the reference electrode of one cell and the respective resistance to supply a voltage equal to the difference between the voltage drops across the respective resistances and to equalize the voltages at the reference electrodes of both cells.

22. In combination, a first test cell comprising a reference electrode and a dropping mercury electrode positioned in a first test solution containing constituents which it is desired to measure and interfering constituents, a second test cell comprising a reference electrode and a dropping mercury electrode positioned in a second test solution containing the interfering constituents present in the first solution, an adjustable voltage source common to both sets of electrodes for impressing the same potential at each dropping electrode, first resistance means adapted to be connected in circuit with the reference electrode of the first test cell for producing a voltage drop proportional to the current therein, switch means controlling the circuit connection of the first resistance means to the first test cell, second resistance means adapted to be connected in circuit with the reference electrode of the second test cell for producing a voltage drop proportional to the current therein, switch means controlling the circuit connection of the second resistance to the second test cell, means operative in timed relation with said droplet initiating means for actuating said switch means to connect said resistance means in circuit with the respective test cells, and means for indicating the difference between the voltage drops across the respective resistance means as a measure of the difference between the currents in the respective test cells.

23. In combination, a first test cell comprising a reference electrode and a dropping mercury electrode immersed in a first test solution, a second test cell comprising a reference electrode and a dropping mercury electrode immersed in a second test solution, means for applying voltages across said test cell electrodes, means for initiating the formation of mercury droplets simultaneously at both dropping electrodes, means acting in timed relation with said droplet initiating means for producing a voltage proportionate to the current in said first cell, means for storing said voltage so produced, means operative a predetermined time interval after formation of a droplet at the dropping electrode of the second cell for producing a voltage proportionate to the current in said second cell, means for adjusting the relative timing of said first and second voltage producing means to equalize the effects of the dropping electrodes, and means for causing the stored voltage to oppose the voltage proportionate to the current in the second cell to actuate an indicator.

24. In combination, a first test cell comprising a reference electrode and a dropping mercury electrode positioned in a first test solution, a second test cell comprising a reference electrode and a dropping mercury electrode positioned in a second test solution, means for applying equal voltages at the dropping electrodes of both test cells, equal resistances connected in series with the reference electrode of each cell, means for initiating the formation of successive mercury droplets at the dropping electrode of the first cell, means for initiating the formation of successive mercury droplets at the dropping electrode of the second cell, means for adjusting the relative times at which mercury droplets are formed at the dropping electrodes of the respective cells, and means operative in timed relation with the mercury droplet initiating the voltage difference between the respective reference electrodes as a measure of the difference between the currents in the respective cells.

25. Apparatus as in claim 21, further characterized by an adjustable voltage source connected in series between the reference electrode of one cell and the respective resistance for equalizing the voltages at the reference electrodes of the test cells.

26. Apparatus as in claim 22, further characterized by an adjustable calibrated voltage source selectively connectable in circuit with said indicating means to oppose the voltage at the reference electrode of one of said cells, whereby a null reading of said indicating means is obtained responsive to adjustment of said calibrated voltage source to equal the voltage at said reference electrode.

References Cited in the file of this patent

UNITED STATES PATENTS

| Number | Name | Date |
|---|---|---|
| 2,343,885 | Coleman | Mar. 14, 1944 |
| 2,361,295 | Kanner et al. | Oct. 24, 1944 |
| 2,438,583 | Steghart et al. | Mar. 30, 1948 |
| 2,569,100 | Heyrovsky | Sept. 25, 1951 |